United States Patent [19]

Sumiya et al.

[11] Patent Number: 4,668,587
[45] Date of Patent: May 26, 1987

[54] MAGNETIC RECORDING MEDIUM

[75] Inventors: Kenji Sumiya, Suita; Osamu Saito, Takatsuki, both of Japan

[73] Assignee: Hitachi Maxell, Ltd., Osaka, Japan

[21] Appl. No.: 841,786

[22] Filed: Mar. 20, 1986

[30] Foreign Application Priority Data

Mar. 20, 1985 [JP] Japan .................................. 60-56434

[51] Int. Cl.$^4$ ................................................ G11B 5/72
[52] U.S. Cl. .................................. 428/411.1; 427/131; 427/132; 428/457; 428/694; 428/900; 428/695
[58] Field of Search ............... 427/131, 132; 428/695, 428/694, 411.1, 900, 457; 360/134–136

[56] References Cited

U.S. PATENT DOCUMENTS

| | | | |
|---|---|---|---|
| 3,922,389 | 11/1975 | Toledo | 427/132 |
| 4,074,012 | 2/1978 | Heikkinen | 428/694 |
| 4,315,057 | 2/1982 | Horigome | 428/694 |
| 4,425,404 | 1/1984 | Suzuki | 428/695 |
| 4,464,279 | 8/1984 | Arai | 428/694 |
| 4,529,651 | 7/1985 | Kitoo | 427/131 |
| 4,592,948 | 6/1986 | Kohmoto | 427/131 |

FOREIGN PATENT DOCUMENTS

| | | | |
|---|---|---|---|
| 0103127 | 6/1982 | Japan | 428/694 |
| 0198525 | 11/1984 | Japan | 427/132 |

Primary Examiner—Ellis P. Robinson
Attorney, Agent, or Firm—Birch, Stewart, Kolasch & Birch

[57] ABSTRACT

A magnetic recording medium comprising a substrate, a magnetic layer containing ferromagnetic metal as a magnetic material on at least one of the surfaces of the substrate and a top coating on the magnetic layer which contains a salt of a nitrogen-containing heterocyclic compound and an aliphatic amine, which has improved corrosion resistance and running stability.

6 Claims, No Drawings

MAGNETIC RECORDING MEDIUM

BACKGROUND OF THE INVENTION

FIELD OF THE INVENTION

The present invention relates to a magnetic recording medium. More particularly, it relates to a magnetic recording medium comprising a substrate, a magnetic layer of ferromagnetic metal on the substrate and a top coating on the magnetic layer.

STATE OF ART DISCUSSION

Magnetic characteristics of a magnetic recording medium having a magnetic layer of ferromagnetic metal is easily deteriorated by corrosion in comparison with one having a magnetic layer comprising a metal oxide magnetic powder. In addition, the surface lubricity greatly affects running stability of the medium. For these reasons, it has been proposed to provide a top coating on the magnetic layer of the ferromagnetic metal of the magnetic recording medium so as to increase corrosion resistance and running stability. The conventional top coating comprises a nitrogen-containing heterocyclic compound such as benzotriazole and tolyltriazole or an aliphatic amine such as laurylamine and triethanolamine.

However, the top coating comprising the nitrogen-containing heterocyclic compound does not materially improve the running stability although it considerably improves the corrosion resistance. The top coating comprising the aliphatic amine hardly improves the corrosion resistance to a satisfactory extent although it greatly improves the running stability.

The present inventors have tried to form a top coating comprising a mixture of the nitrogen-containing heterocyclic compound and the aliphatic amine on the magnetic layer of the ferromagnetic metal. In this case, the improvement of the corrosion resistance is achieved to an expected extent while the running stability is inferior to the top coating comprising the aliphatic amine alone. Namely, co-presence of the both compounds suppresses the effect of the aliphatic amine for improving the running stability.

SUMMARY OF THE INVENTION

An object of the present invention is to provide a magnetic recording medium comprising a magnetic layer of ferromagnetic metal which has both improved corrosion resistance and improved running stability.

Accordingly, the present invention provides a magnetic recording medium comprising a substrate, a magnetic layer containing ferromagnetic metal as a magnetic material on at least one of the surfaces of the substrate and a top coating on the magnetic layer which contains a salt of a nitrogen-containing heterocyclic compound and an aliphatic amine.

DETAILED DESCRIPTION OF THE INVENTION

The salt of the nitrogen-containing heterocyclic compound and the aliphatic amine is commercially available or easily prepared by reacting the both compound in an polar solvent (e.g. water, alcohols and the like), or by directly reacting both compounds under a temperature above their melting points.

Examples of the nitrogen-containing heterocyclic compound are triazoles (e.g. benzotriazole and tolyltriazole), imidazoles (e.g. benzimidazole, 1H-naphth[2,3-d]-imidazole of the following formula (I) and the like), carbazoles (e.g. 6H-dibenzo[d,h]carbazole of the following formula (II) and the like) and indoles (e.g. 1H-indole):

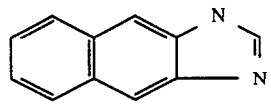
(I)

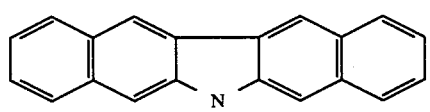
(II)

The nitrogen-containing heterocyclic compound may be used alone or in combination.

As the aliphatic amine, any of primary or secondary amines can be used to form a salt with the nitrogen-containing heterocyclic compound. Preferably, the aliphatic amine has 1 to 40 carbon atoms, particularly 5 to 35 carbon atoms, especially 8 to 32 carbon atoms in an aliphatic residue. Specific examples of the aliphatic amine are primary amines such as caprylamine, laurylamine, myristylamine, palmitylamine, cetylamine, stearylamine, ethylamine, octadecylamine, dodecylamine and the like; and secondary amines such as diethylamine, diamylamine and the like.

Among the salts of the nitrogen-containing heterocyclic compound and the aliphatic amine, those comprising the triazole as the nitrogen-containing heterocyclic compound are preferred. Particularly, a salt of the formula:

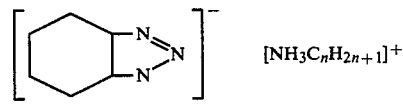
(III)

wherein n is an integer of 8 to 32.

When the top coating containing the salt of the nitrogen-containing heterocyclic compound and the aliphatic amine is applied on the surface of the magnetic layer, a coefficient of friction of the surface is decreased due to lubricating effect of the salt so that the running stability of the magnetic recording medium is improved.

While a mere mixture of the nitrogen-containing heterocyclic compound and the aliphatic amine does not impart a prolonged lubricating effect to the magnetic recording medium, the salt of the nitrogen-containing heterocyclic compound can accomplish at least the same running stability as the aliphatic amine alone. In addition, the rust preventing effect of the nitrogen-containing heterocyclic compound can be exerted by the salt. Therefore, the salt can impart both corrosion resistance and good running stability to the magnetic recording medium.

The salt can be coated on the surface of the magnetic layer by various methods. For example, a solution of the salt in a suitable organic solvent is applied on the surface of the magnetic layer and dried to remove the solvent. Examples of the organic solvent are aromatic solvents (e.g. toluene), ketones (e.g. methyl isobutyl ketone, methyl ethyl ketone and acetone), alcohols (e.g. methanol, ethanol and isopropanol), etc. Usually, the salt is dissolved in the solvent in a concentration of 0.01 to 2.5% by weight, preferably 0.05 to 0.3% by weight and applied on the magnetic layer in an amount of 0.01 to 200 mg/m$^2$, preferably 0.5 to 50 mg/m$^2$.

The magnetic layer on which the top coating of the salt is formed includes those comprising ferromagnetic metal. Examples of the ferromagnetic metal are cobalt, nickel and iron, alloys of these metals optionally including a nonmetallic element, alloys of at least one of these metals and at least one of other metals (e.g. copper, zinc, manganese, chromium and aluminum) optionally containing a nonmetallic element. The magnetic layer may be formed by vaporizing the ferromagnetic metal on the substrate or applying a mixture of the ferromagnetic metal particles and a binder on the substrate. The substrate may be a conventional one, for example, a film of a polyester. The mixture can be applied on the substrate by a per se conventional method, for example, by coating the mixture on the substrate, dipping the substrate in the mixture or transferring the mixture contained in a back coating to the surface of the substrate in a wound state.

The magnetic recording medium includes a magnetic recording tape, a magnetic disk, a magnetic drum and the like.

The present invention will be hereinafter exlained further in detail by following examples, in which parts and percentages are by weight unless otherwise indicated.

EXAMPLE 1

By means of a vacuum vaporizing apparatus, under reduced pressure of $5 \times 10^{-5}$ Torr, metal cobalt was vaporized on a surface of a film of polyethyleneterephthalate with a thickness of 12 microns to form a cobalt layer of 0.1 microns in thickness.

Then, on the cobalt layer, a 0.1% solution of a salt of benzotriazole and laurylamine in methyl isobutyl ketone was coated and dried to evaporate the solvent to form a top coating. The coated film was cut to form a magnetic recording tape.

EXAMPLE 2

In the same manner as in Example 1 but using a 0.1% solution of a salt of benzotriazole and stearylamine in methyl isobutyl ketone in place of the 0.1% solution of a salt of benzotriazole and laurylamine in methyl isobutyl ketone, the magnetic recording tape was produced.

COMPARATIVE EXAMPLE 1

In the same manner as in Example 1 but using a 0.1% solution of benzotriazole in methyl isobutyl ketone in place of the 0.1% solution of a salt of benzotriazole and laurylamine in methyl isobutyl ketone, the magnetic recording tape was produced.

COMPARATIVE EXAMPLE 2

In the same manner as in Example 1 but using a 0.1% solution of laurylamine in methyl isobutyl ketone in place of the 0.1% solution of a salt of benzotriazole and laurylamine in methyl isobutyl ketone, the magnetic recording tape was produced.

COMPARATIVE EXAMPLE 3

In the same manner as in Example 1 but using a solution of 0.1% of benzotriazole and 0.1% of stearylamine in toluene in place of the 0.1% solution of a salt of benzotriazole and laurylamine in methyl ethyl ketone, the magnetic recording tape was produced. In this case, the top coating contained unreacted benzotriazole and laurylamine.

The magnetic recording tapes produced in Examples 1 and 2 and Comparative Examples 1 to 3 were examined for a coefficient of friction of the surface, jitter and corrosion resistance as follows:

Coefficient of friction

Around a peripheral surface of a steel made cylinder of 4 mm in diameter (surface roughness of 0.28), a magnetic recording tape is placed at an angle of 90° with the magnetic layer surface contacting the cylinder surface. Then, one end of the tape is pulled at a rate of 1.4 cm/sec. with applying a load of 20 g to the other end of the tape. After the tape is pulled one hundred times, a coefficient of friction of the surface of the magnetic layer is measured.

Jitter

A magnetic recording tape is installed in a video deck, and video signals are recorded and reproduced. An interval of horizontal synchronizing signal of the reproduced signal at 15.75 KHz is recorded and deviation of the horizontal synchronizing signal is measured and recorded as jitter.

Corrosion resistance

A magnetic recording tape is kept standing at 60° C., 90% RH for seven days and then maximum magnetic flux density is measured and compared with the new magnetic recording tape (100%).

The results are shown in Table 1.

TABLE 1

| Example No. | Coefficient of friction | Jitter ($\mu$m) | Corrosion resistance (%) |
| --- | --- | --- | --- |
| 1 | 0.18 | 0.10 | 93 |
| 2 | 0.17 | 0.09 | 94 |
| Comp. 1 | 0.31 | 0.28 | 92 |
| Comp. 2 | 0.18 | 0.10 | 84 |
| Comp. 3 | 0.22 | 0.13 | 90 |

EXAMPLE 3

On a surface of a film of polyethleneterephthalate with a thickness of 3.0 microns, a magnetic coating composition having the following composition was coated and dried to form a magnetic layer of 10 microns in thickness:

| Component | Parts |
| --- | --- |
| Fe metal powder (Average particle size = 0.25 microns) | 80 |
| Hydroxyl group containing vinyl chloride-vinyl acetate copolymer (VAGH manufactured by UCC, U.S.A.) | 16 |
| Polyurethane prepolymer (Takenate manufactured by Takeda Chemical, Japan) | 4 |
| Trifunctional low molecular weight isocyanate compound | 2 |
| Toluene | 62 |
| Cyclohexanone | 62 |

On the surface of the magnetic layer, a 2.0% solution of the same salt of benzotriazole and laurylamine as used in Example 1 in methyl isobutyl ketone was coated and dried to evaporate the solvent to form a top coating. The thus coated film was cut to produce a magnetic recording tape.

EXAMPLE 4

In the same manner as in Example 3 but using a 2.0% solution of a salt of benzotriazole and stearylamine in methyl isobutyl ketone in place of the 2.0% solution of a salt of benzotriazole and laurylamine in methyl isobutyl ketone, the magnetic recording tape was produced.

COMPARATIVE EXAMPLE 4

In the same manner as in Example 3 but using a 2.0% solution of benzotriazole in methyl isobutyl ketone in place of the 2.0% solution of a salt of benzotriazole and laurylamine in methyl isobutyl ketone, the magnetic recording tape was produced.

COMPARATIVE EXAMPLE 5

In the same manner as in Example 3 but using a 2.0% solution of laurylamine in methyl isobutyl ketone in place of the 2.0% solution of a salt of benzotriazole and laurylamine in methyl isobutyl ketone, the magnetic recording tape was produced.

COMPARATIVE EXAMPLE 6

In the same manner as in Example 3 but using a solution of 2.0% of benzotriazole and 2.0% of stearylamine in toluene in place of the 2.0% solution of a salt of benzotriazole and laurylamine in methyl ethyl ketone, the magnetic recording tape was produced. In this case, the top coating contained unreacted benzotriazole and laurylamine.

The magnetic recording tapes produced in Examples 3 and 4 and Comparative Examples 4 to 6 were examined for a coefficient of friction of the surface, jitter and corrosion resistance in the same ways as described in the above.

The results are shown in Table 2.

TABLE 2

| Example No. | Coefficient of friction | Jitter ($\mu$m) | Corrosion resistance (%) |
|---|---|---|---|
| 3 | 0.16 | 0.09 | 92 |
| 4 | 0.16 | 0.09 | 93 |
| Comp. 4 | 0.30 | 0.28 | 93 |
| Comp. 5 | 0.17 | 0.09 | 82 |
| Comp. 6 | 0.20 | 0.12 | 90 |

As understood from the results of Tables 1 and 2, the magnetic recording tapes according to the present invention have excellent corrosion resistance and running stability.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a substrate, a magnetic layer containing ferromagnetic metal as a magnetic material on at least one of the surfaces of the substrate and a top coating on the magnetic layer which contains at least one salt of a nitrogen-containing heterocyclic compound and an aliphatic amine.

2. The magnetic recording medium according to claim 1, wherein the nitrogen-containing heterocyclic compound is one selected from the group consisting of triazoles, imidazoles, carbazoles and indoles.

3. The magnetic recording medium according to claim 2, wherein the nitrogen-containing heterocyclic compound is a triazole.

4. The magnetic recording medium according to claim 1, wherein the aliphatic amine is a primary or secondary amine.

5. The magnetic recording medium according to claim 1, wherein the aliphatic amine has 8 to 32 carbon atoms in an aliphatic residue.

6. The magnetic recording medium according to claim 1, wherein the salt is one represented by the formula:

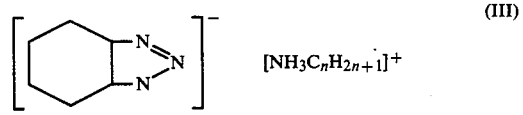

(III)

wherein n is an integer of 8 to 32.